Figure 2:
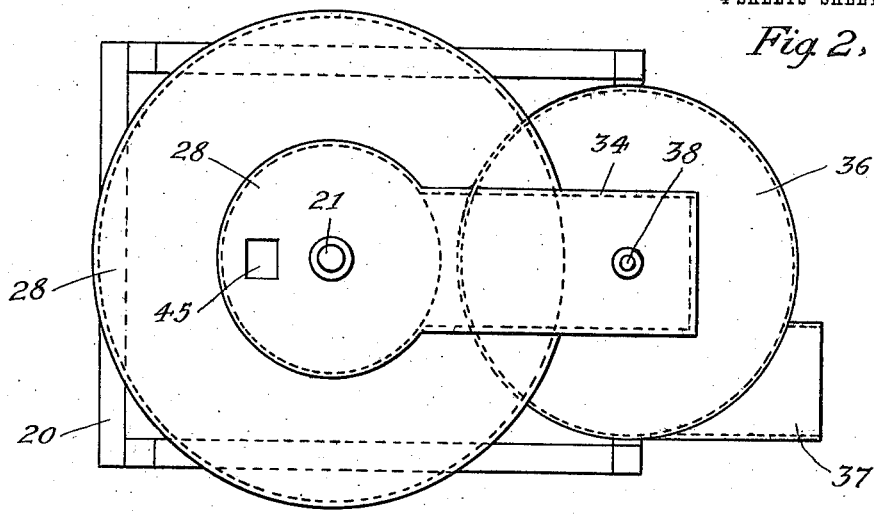

K. DOUGAN.
MACHINE FOR DELINTING COTTON SEED.
APPLICATION FILED DEC. 26, 1911.

1,092,983.

Patented Apr. 14, 1914.
4 SHEETS—SHEET 1.

Witnesses:
Theo. Lagaard.
H. A. Bowman.

Inventor:
Kennedy Dougan.
By F. A. Whiteley
his Attorney.

K. DOUGAN.
MACHINE FOR DELINTING COTTON SEED.
APPLICATION FILED DEC. 26, 1911.
1,092,983.
Patented Apr. 14, 1914.
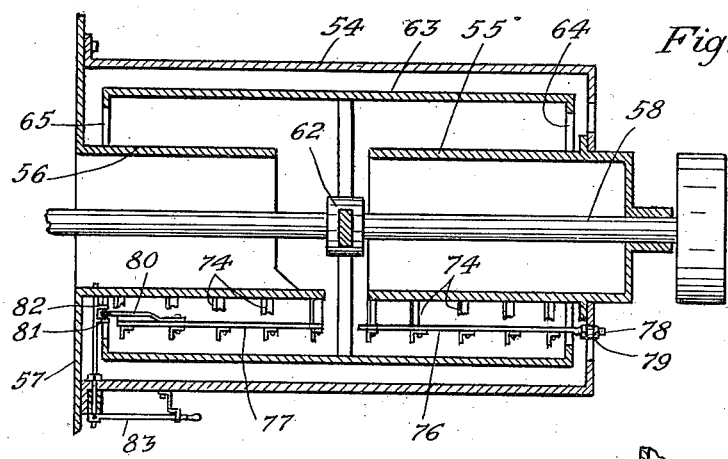
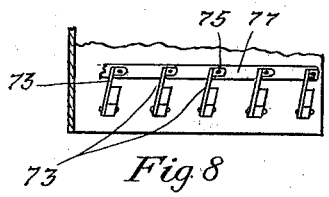
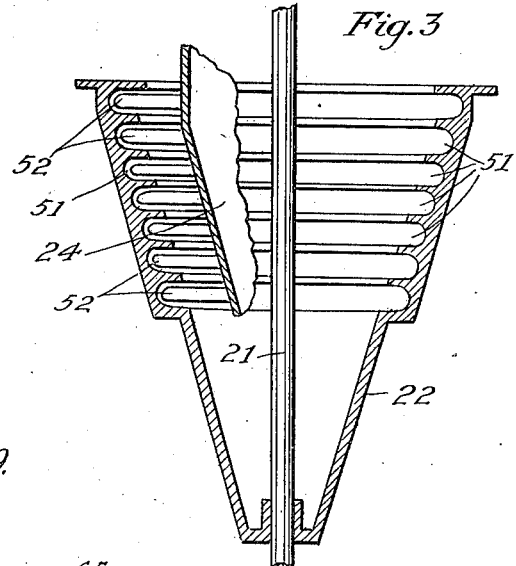
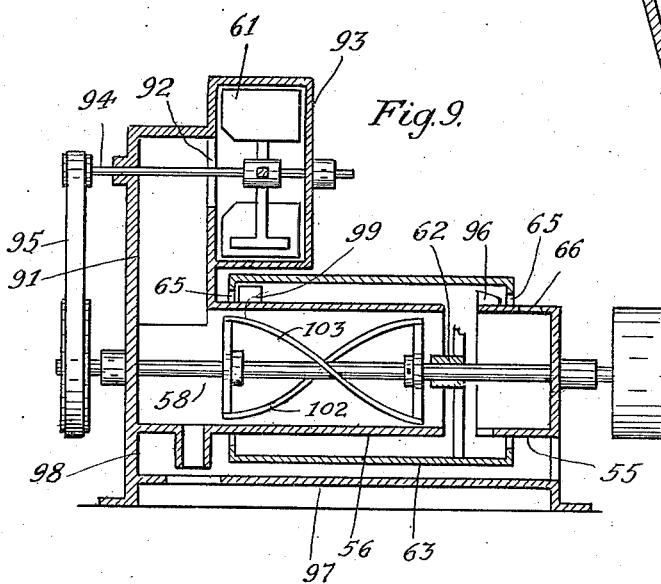
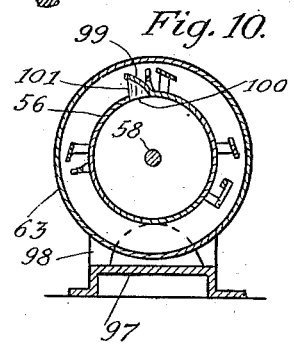
Witnesses:
Theo. Lagard
H. A. Bowman
Inventor:
Kennedy Dougan.
By F. A. Whiteley
his Attorney.

K. DOUGAN.
MACHINE FOR DELINTING COTTON SEED.
APPLICATION FILED DEC. 26, 1911.
1,092,983.
Patented Apr. 14, 1914.
4 SHEETS—SHEET 3.
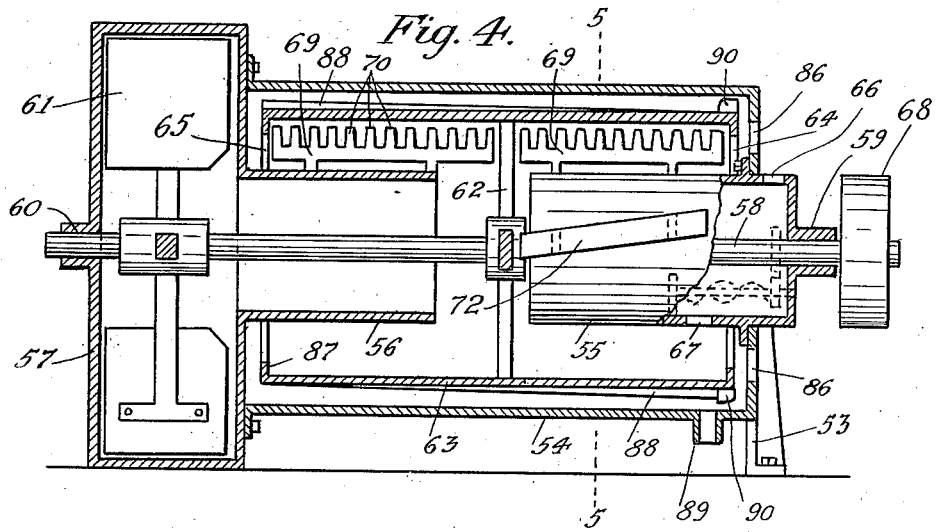
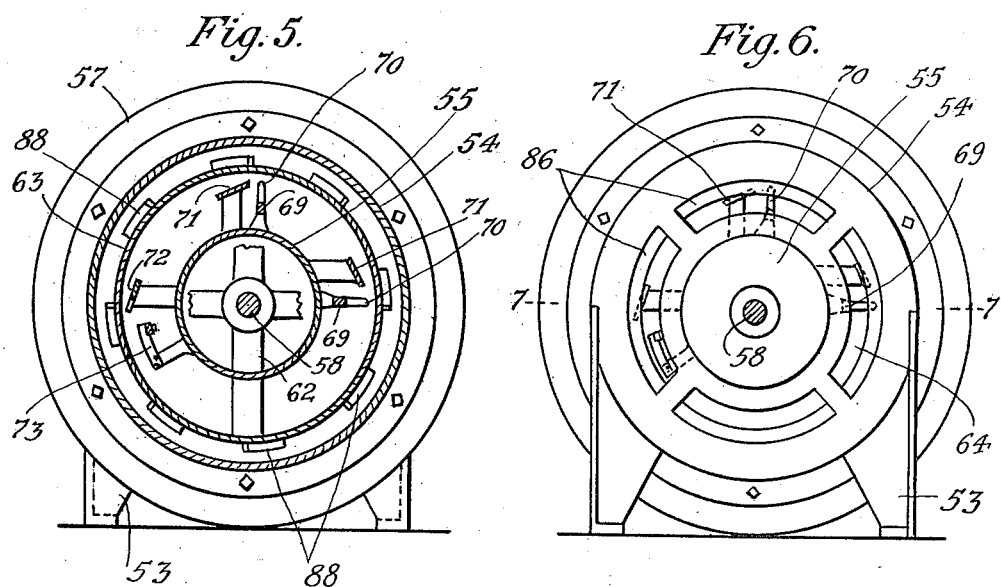
Witnesses:
Theo. Lagaard
H. A. Bowman
Inventor:
Kennedy Dougan.
By F. A. Whiteley
his Attorney.
COLUMBIA PLANOGRAPH CO., WASHINGTON, D. C.

K. DOUGAN.
MACHINE FOR DELINTING COTTON SEED.
APPLICATION FILED DEC. 26, 1911.
1,092,983.
Patented Apr. 14, 1914.
4 SHEETS—SHEET 4.
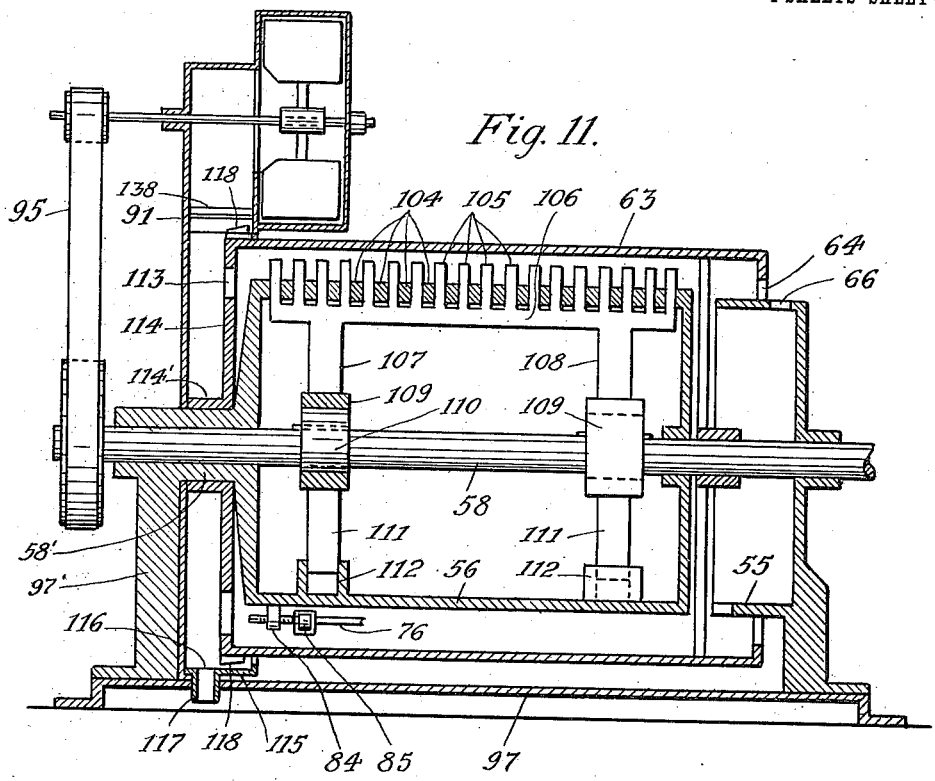
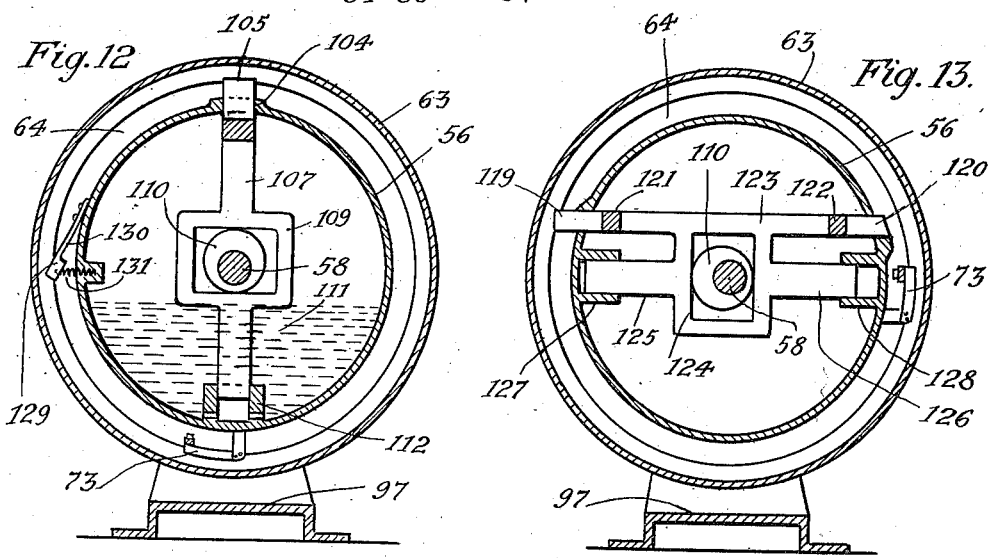
Witnesses:
Theo. Lagaard.
H. A. Bowman
Inventor:
Kennedy Dougan.
By H. A. Whiteley
his Attorney.

UNITED STATES PATENT OFFICE.

KENNEDY DOUGAN, OF MINNEAPOLIS, MINNESOTA.

MACHINE FOR DELINTING COTTON-SEED.

1,092,983.  Specification of Letters Patent.  Patented Apr. 14, 1914.

Application filed December 26, 1911. Serial No. 667,942.

*To all whom it may concern:*

Be it known that I, KENNEDY DOUGAN, a citizen of the United States, residing at Minneapolis, in the county of Hennepin and State of Minnesota, have invented certain new and useful Improvements in Machines for Delinting Cotton-Seed, of which the following is a specification.

My invention relates to a machine for delinting cotton seed and which is also applicable for scouring or hulling grain or disintegrating flaked stock in a flour mill. It will operate upon material in either a dry or wet condition or even semi-liquid material.

It is the object of my invention to provide a machine for the above purposes which shall be simple and efficient and shall perform the aforesaid operation of removing the lint on seed cotton or scouring or hulling grain or disintegrating flaked stock, as above noted, in a more complete and satisfactory manner than has been accomplished by machines designed for the same purpose.

To this end my machine includes the devices and structures herein described and claimed, more particularly involving the use of a container rotating at high speed into which the stock is fed, being carried around thereby and held by centrifugal action in a sheet against the walls of the container, which sheet, while thus being moved at high speed, is acted upon by stationary or movable members or both to cause the individual members forming the sheet to move under high pressure in contact with one another and by mutual attrition as well as contact with said devices effect the delinting or scouring action aforesaid. At the same time that the sheet of material is being so acted upon it will be subject to means for forwarding it along the cylinder and also will be subject to currents of air in close proximity to the sheet of material for separating and withdrawing the lint, dust or hulls from the container.

The full objects and advantages of my invention will appear in connection with the detailed description thereof, and are particularly pointed out in the claims.

Figure 1:
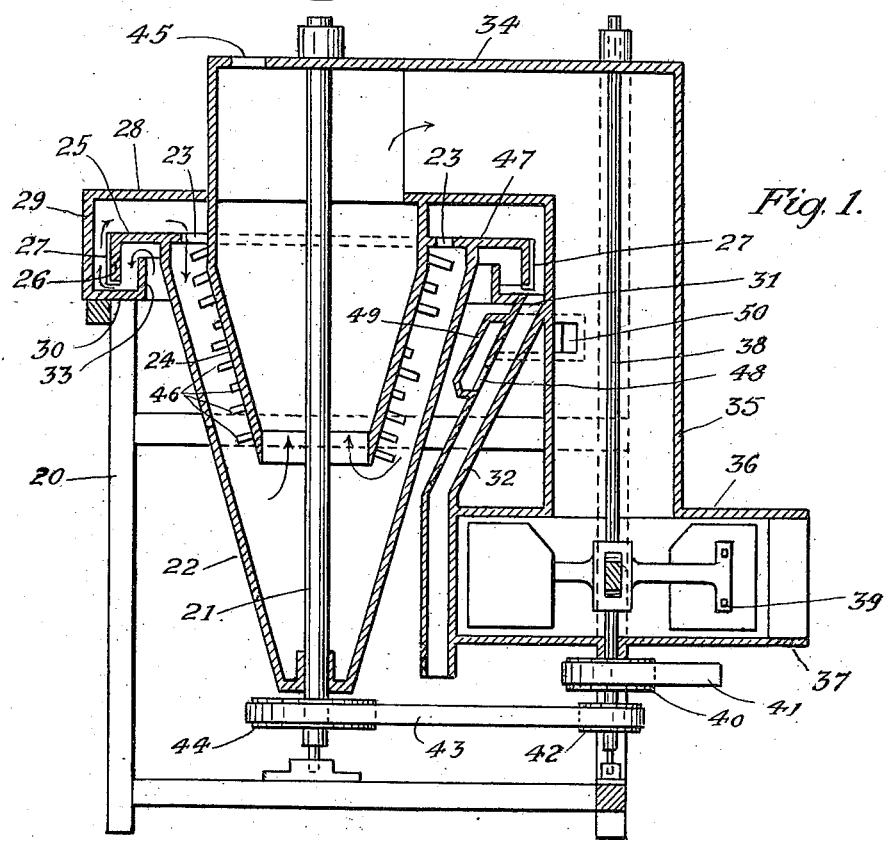

In the drawings representing the application of my invention in certain forms,— Figure 1 is a sectional elevation of a basic form of my device. Fig. 2 is a plan of the same. Fig. 3 shows a modification of the container shown in Fig. 1. Fig. 4 is a sectional plan of another form of my invention. Fig. 5 is a section on line 5—5 of Fig. 4. Fig. 6 is an end elevation of parts shown in Fig. 4. Fig. 7 is a sectional plan on line 7—7 of Fig. 6. Fig. 8 is a detail of the means for varying the rate of forwarding stock through the machine. Fig. 9 is a sectional elevation view of a modified form of the invention. Fig. 10 is a transverse section of this modification. Fig. 11 is a sectional elevation of a form of my device showing movable members for engaging the centrifugally held sheet of material. Figs. 12 and 13 are transverse sections illustrating the manner in which said movable members may be operated.

Referring to Figs. 1, 2 and 3, a frame or casing 20 is provided in which is vertically mounted a spindle or shaft 21 upon which is rigidly secured an upright container 22 having outwardly flaring walls, as shown. The upper end of the container is provided with an enlarged opening 23 surrounding a depending member 24 which has flaring walls extending parallel with the walls of container 22 and which is of such size as to be spaced from the walls of container 22 the required distance. Upon the top of container 22 is formed an annular horizontal table 25, and formed along the outer peripheral edge of said table is a depending flange 26 provided along the outside and lower edge thereof with extensions or corrugations 27. Surrounding and secured to the outer walls of the member 24 is an annular table 28 which extends to a point beyond the outer peripheral limits of the table 25 and is provided with a depending wall 29, and lower floor 30 by means of which said table and member 24 may be secured to frame 20. The floor 30 is in the form of an annular ring and is provided at one point with an opening 31 leading into a discharge spout 32. Upstanding from the inner peripheral edge of the ring 30 is a flange 33 which is parallel with the wall 29. The flange 33 and wall 29 are spaced from the member 26 depending from table 25 and the wall 33 is also spaced from the walls of container 22 so that an annular passage is provided extending, as indicated by the arrows, from outside of the machine into the chamber formed between container 22 and table 25 carried thereby and member 24 and table 28 carried thereby.

The interior of member 24 is connected, by means of the large passage-way 34 which has a downwardly extending trunk 35, with the central portion of a fan casing 36 provided with the usual tangential discharge opening 37. Upon a vertical spindle 38 supported in bearings in the frame and casing is secured a fan 39 operative in said casing 36. A pulley 40 on spindle 38 is driven by a belt 41 from any suitable source of power. Another pulley 42 on spindle 38 may be connected by belt 43 with a pulley 44 on spindle 21 by means of which said spindle and the container 22 carried thereby are to be rotated, the ratio of gearing being such that in practice the container 22 will be rotated somewhat less rapidly than the fan 39.

The ginned cotton seed or other stock to be operated upon will be fed through an opening 45 formed in the top of member 24, the stock being fed to said opening by any of the well known feeding devices which it is unnecessary to describe herein. When the stock, after passing through the interior of member 24, comes in contact with the rapidly rotating walls of the container 22 it is caused to rotate therewith and by centrifugal force will be moved along the outwardly flaring walls upwardly in a closely compacted sheet. When it reaches that portion of the container adjacent and spaced from the walls of member 24 it will come in contact with a series of round pins 46 secured to the stationary walls of the member 24. By this time, owing to the very great speed at which the container is rotated (which may be one hundred revolutions or less for some purposes up to several hundred or a thousand revolutions per minute or even more,) the sheet of material will be densely compacted and, of course, be moving at very high velocity. The pins 46 entering the aforesaid sheet under such conditions will cause the individual cotton seeds or other individual members of the stock to be violently rubbed under great pressure against one another and the aforesaid pins, and the resulting attrition will effect the separation of the lint from the seed and thoroughly clean the same. The upward advance of the sheet will be at such a rate that by the time the end thereof has reached the opening 23 the seed will have been thoroughly delinted and scoured. It will be noted that the table 25 projects somewhat within the upper edge of the walls of container 22, as indicated at 47, this arrangement holding the sheet from moving too rapidly out of the container. The cotton seed after the same has been delinted will be heavier in proportion to its bulk than that seed which has not been delinted, and consequently will move to the inside of the sheet close to the walls of the container. The undelinted seed, therefore, will tend to remain on the outside of the sheet, and also will stick to the mass of undelinted seed forming the lower or rear portions of the sheet, while the smooth delinted seed next to the walls of the container will move up the container where it will finally escape through the opening 23 and be thrown by rotating table 25 against wall 29, where it will be beaten by ribs 27 and be carried around and discharged through opening 31 and discharge pipe 32. During all of this operation the air drawn by the fan 39 will be passing in a continuous and powerful current from outside first through the annular opening between upstanding wall or ring 33 and the outer walls of container 22 beneath depending members 26 above table 25 through opening 23 and between the inner walls of container 22 and member 24 into the interior of said member 24 and out through the fan, as indicated by the arrows. Discharge pipe 32 may also be provided with an opening 48 into a pipe 49 opening into the main fan trunk 35, as indicated at 50, so that a current of air will be drawn up through discharge pipe 32 to remove the last vestige of lint or dust from the delinted or cleaned stock discharged from the pipe 32.

In the form of this invention shown in Fig. 3, the container 22 has provided in the upper walls thereof a series of corrugations 51 in which pins 52, which may be somewhat longer than the pins 46, are caused to operate. By this means the average thickness of the sheet will be somewhat diminished, and in case of sudden stoppage of the machine there will not be in container 22 a sufficient amount of stock to clog and prevent operation of the machine when stock falls to the bottom of the container.

In Figs. 4 to 8, inclusive, is shown the application of my invention to a horizontal container. A framework 53 has rigidly secured thereto an outer cylindrical casing 54 and an inner cylindrical casing 55, extending outside of cylindrical casing 54 at the front or feed end of the machine and terminating short of the center of cylindrical casing 54. A second inner cylindrical casing 56 opens at the discharge end into the center of a fan casing 57 to which it is rigidly secured and which is rigidly secured with outer casing 54 to the frame of the machine. A horizontal shaft 58 is mounted in a bearing 59 formed at the end of casing 55 and a similar bearing 60 formed in the outside end of fan casing 57. Within fan casing 57 is secured upon shaft 58 a fan 61 of usual construction. Near the center of casing 54 and just beyond the end of inner casing 55 a spider 62 is fast on shaft 58, said spider having rigidly secured thereto a cylinder 63 which is formed with openings 64 and 65 at the front and rear ends of the cylinder, respectively, said openings being of such size as to leave a ring-like passage surrounding inner cylinders 55 and 56, as clearly shown in Figs. 4 and 6. Inner cylinder 55 is closed at the forward end but open at the inner end and inner cylinder 56 is open at both ends, as most clearly shown in Fig. 7. A feed opening 66 is provided in the upper portion of inner cylinder 55 which may be connected with means for feeding stock of usual construction, another feed opening 67 communicating from the inside of cylinder 55 at the bottom thereof with the interior of rotatable cylinder 63. If desired, an abutment and forced feed, as indicated in dotted lines in Fig. 4, may be employed, though ordinarily the action of gravity can be depended upon to feed the stock to the interior of cylinder 63. It will be noted that the opening 67 is spaced some distance to the rear of the front end of cylinder 63 so that the stock will be fed to the inside of cylinder 63 at a point sufficiently removed from opening 64 to insure that none of it will be returned through opening 64.

The shaft 63 and parts carried thereby are rotated at high speed by means of a pulley 68 connected with any desired source of power. As the cotton seed or other stock is fed to the interior of cylinder 63 the rapidly rotating inner walls thereof will impart motion to the cotton seed or other stock which through centrifugal force will quickly be compacted into a sheet rotating with the said inner walls. It is designed to rotate the cylinder 63 at a very high rate of speed, anywhere from 400 to 600 revolutions per minute. At this speed the centrifugal force generated will compact the cotton seed into a sheet of such density that the individual units of the sheet will be held in contact under high pressure. If, therefore, stationary members are positioned so as to engage the rotating sheet the effect will be to cause the individual seeds to rub against one another and against such stationary members under the same conditions of high pressure, so that by mutual attrition the lint or other material will be removed from the seeds while at the same time jamming or wedging which might cause a crushing or breaking of the seeds will be impossible.

It is contemplated by me and falls within the scope of my invention to provide such stationary members, which may conveniently be secured to the cylinders 55 and 56, of different forms and characters so as to best perform the particular function required in connection with the delinting of different grades of cotton seed, or in case the machine is used for grain scouring, disintegrating flaked stock or other purposes. The particular forms of stationary members shown are well adapted to meet some of the requirements of my machine, but it is to be understood that I do not intend to limit myself to the form or forms of stationary members herein shown, but intend to claim broadly any form and character of relatively stationary member operating in connection with a sheet of cotton seed or other stock formed on the inside of a rotating member by the centrifugal force generated through said rotation.

In the form of stationary members shown in Figs. 4 to 10, I employ a series of one or more combs 69 secured to cylinders 55 and 56. The teeth 70 of said combs may be rounded or blunt ended. Just to the rear of the combs 69 are provided obliquely disposed baffle plates 71 also secured to cylinders 55 and 56. The ends of pins 70 and the forward edge of baffle plates 71 are brought near enough to the inner walls of cylinders 63 to enter the sheet of centrifugally compacted cotton seed or other stock, but do not approach sufficiently close to turn the entire sheet away from the rotating cylinder wall. These obstructions will operate to separate the sheet, spreading it into circumferential lines and causing it to split partly passing over the baffle plates 71, the whole effect being to cause the individual cotton seeds or members of the sheet to be mutually rubbed one against the other, against the obstruction or stationary members, and to some extent against the rotating cylinder wall, all under the high pressure generated by the centrifugal action of the machine, such rubbing effecting the separation of the lint or other matter from the hulls of the seed and properly cleaning the same.

A special type of baffle plate 72 may be secured to cylinders 55 and 56, said baffle plate being, as shown, placed obliquely and having the forward edge thereof spaced the farthest from the cylinder 63. The obliquity of the baffle plates 72 is such as to tend to cause the sheet of stock as it contacts therewith to move longitudinally along the interior of cylinder 63, which is the primary function of the baffle plate 72. Additional means may be provided for this purpose consisting of a series of wing members 73 each secured to a post 74 on cylinders 55 or 56. The wing members will be formed of spring metal and normally will be somewhat oblique to the direction of rotation of the cylinder 63. The free ends of members 73 are provided with offset plates 75 by which those on cylinder 55 are pivoted to a rod 76 and those on cylinder 56 to a rod 77, rod 76 being adjustably held in position by means of a threaded end 78 and pair of nuts 79 fastening the same to the end wall of cylinder 54 while rod 77 may be adjustably held by a link 80 connected therewith, which link is pivoted at 81 to a rock shaft 82 operated by a hand lever 83. By this means the pitch of the wing members 73 may be varied as desired to feed the sheet of cotton seed or other stock more or less rapidly along the interior of cylinder 63. In the form of the device shown in Fig. 11, rod 76 may be directly threaded into a lug 84 on the stationary cylinder therein shown, and rod 76 be secured by a rotatable joint 85 with each of members 73 so that rotation of rod 76 will operate to effect the desired adjustment.

Under usual conditions the sheet of cotton seed or grain will be fed along the interior of cylinder 63 until it reaches the opening 65 at the end thereof, when it will crowd over the flange 87 provided at the end of said cylinder and will be thrown back against the interior walls of cylinder 54. The outside of cylinder 63 is provided with a series of spiral beaters 88 which are so turned as to engage and forward the stock along the outside of cylinder 88 and inside of cylinder 54 toward the front end of cylinder 54, where a discharge spout 89 leads from the bottom of said cylinder 54. Backwardly turned wings 90 are provided at the front end of cylinder 63 which operate to force the stock into the discharge spout 89 as it reaches the end of cylinder 88.

Cylindrical casing 54 is closed at the front end except for a series of openings 86 corresponding somewhat in position to the opening 64 between casing 63 and cylinder 55. The fan 61 is of relatively large capacity, and the openings 86 will exceed in area the area of opening 64. Air drawn by fan 61 will, therefore, pass through opening 86 and opening 64 and between cylinder 54 and 55 and through interior of cylinder 56 to the fan, and also will pass outside of cylinder 63 between it and the interior of cylinder 54 through opening 65 between cylinder 63 and cylinder 56 and through the interior of cylinder 56 to the fan casing. The cotton seed or other stock being treated will, therefore, be subjected to the action of air currents both while it is within cylinder 63 and while it is outside of said cylinder between the same and the interior of cylinder 54 until it passes out of the discharge spout.

In Figs. 9 and 10 is shown a modified form of the horizontal cylinder type of my invention, in which cylinder 56 opens into a chute 91 communicating through a central opening 92 with a fan casing 93 mounted above the cylinder 63 surrounding the cylinders 55 and 56, the fan 61 in said casing 93 being on a separate shaft 94 driven from shaft 58 by means of a belt and pulley connection 95. In place of the outer stationary cylinder 54 I employ a base plate 97 and legs 98 extending to and supporting cylinders 55 and 56. In this form the cotton seed or other stock is fed through feed opening 66 in any desired manner and passes to the inside of cylinder 63 over the lower inside edge of the cylinder 55. The cylinder 55 is provided with obliquely positioned wing members 96 similar to wing members 90 which tend to move the stock operated upon in a direction away from the forward end of cylinder 63. Cylinder 56 only will be provided with the stationary members for engaging the sheet of material carried around and compacted by centrifugal force upon the inside of cylinder 63. Just within the rear end of cylinder 63 secured to cylinder 56 is a curved flange member 99 which extends upwardly from an opening 100 in cylinder 56 to a point in close proximity to the inner wall of cylinder 63. Flange member 99 has side walls 101 forming in effect a spout which engages the end of the compacted sheet as it is forwarded along the inside of cylinder 63 stripping said sheet from said cylinder and throwing it down into the interior of cylinder 56. Upon the shaft 58 within cylinder 56 a series of spiral blades 102 may be provided which will act as beaters on the stock and at the same time will forward it to a discharge spout 103 located in the bottom of cylinder 56 near the forward end thereof. The openings 64 and 65 between cylinder 63 and cylinders 55 and 56, respectively, as shown in Fig. 9, are substantially the same as in the case of the form shown in Fig. 4 except that the opening 65 will here be made larger so that a relatively larger amount of air will be drawn in at the rear end of cylinder 63, passing between said cylinder and cylinder 56 and through cylinder 56 and trunk 91 to the fan 61.

In the delinting of certain kinds of cotton seed where the fiber remaining upon the seed is quite long and held very tenaciously thereto it may happen that with stationary members acting upon the sheet of cotton seed there will be a tendency for the cotton seed to pile up and clog at the point where the sheet engages the stationary members. In Figs. 11 to 13, which show an organization corresponding closely to that shown in Figs. 9 and 10, I have shown certain members for engaging the sheet of material which are given a movement relative thereto so that said members are caused positively to approach and recede from said sheet of material thereby rendering impossible any piling up or clogging. In the form shown, the cylinder 56 is closed at both ends and provided with one or more series of openings 104 extending through the wall of said cylinder. The openings 104 may be such as to permit movement therethrough of an uninterrupted baffle plate or, as shown, may comprise a sort of grid through which will operate a series of teeth 105 formed on a comb bar 106. In Figs. 11 and 12 this comb bar is shown as being secured to a pair of members 107, 108, respectively, each of said members comprising a yoke 109 surrounding an eccentric 110 on shaft 58. On the other end of the yoke 109 extends a bar 111 held to slide in a bearing 112 formed on the interior of cylinder 56. It will be seen that as the shaft 58 rotates carrying with it cylinder 63, through action of eccentric 110 on the yoke 109 the comb bar 106 will be reciprocated causing the comb teeth 105 to approach and recede from the inner periphery of cylinder 63 once for each rotation of said shaft. By slightly beveling the sides of said teeth from the edge which first engages the sheet of material, or disposing the teeth at a slight angle from the vertical, the action of the teeth alone upon the sheet will be sufficient to forward the same longitudinally.

The delinted cotton seed will be discharged through a series of openings 113 formed in end plate 114 of cylinder 63, this end plate extending from a collar 114' surrounding a tubular extension 58', on frame member 97' supported on base 97. The extension 58' provides at the same time an exterior bearing for shaft 58 and an interior bearing for sleeve or collar 114' connected by end plate 114 with cylinder 63. At the bottom of the fan trunk 91 and extending into close proximity to the rotatable cylinder 63 is a plate 115 and located centrally in said plate is a discharge opening 116 leading to a discharge pipe 117 through which the delinted cotton seed or other material may pass from the machine. Within the fan casing 91, at a point just above where the cylinder 63 extends into the same, a series of obliquely disposed baffle plates 138 are provided for knocking back any seeds which may be thrown upward into the fan casing. Upon the end of cylinder 63 rotating within the expanded cavity of the fan trunk 91 are secured a series of oblique blades 118 which operate to throw the delinted material away from said cylinder and into the discharge opening 116. The currents of air in this form of the device are carried directly through the cylinder 63 between its interior walls and the exterior walls of cylinder 56, entering by the annular opening 64 and passing through the similar opening 113 into the expended fan trunk 91 and from thence to the fan.

In Fig. 13 a plurality of movable sets of comb teeth are shown, part of said comb teeth 119 being similar to comb teeth 105 while the other series of comb teeth 120 may be formed with beveled ends or otherwise varied in shape so as to produce in conjunction with the teeth 119 the most efficient possible action upon the stock being treated. Teeth 119 will be secured to a comb bar 121 and teeth 120 to a comb bar 122, said comb bars being secured to a pair of transverse bars 123 having formed on one side thereof yoke bearing members 124 surrounding the eccentrics 110 on shaft 58. The yoke member 124 has secured thereto oppositely disposed arms 125, 126 which slide in bearings 127, 128, respectively, secured to opposite sides of the interior of cylinder 56. It will be seen that when the shaft 58 is rotated the comb members 121, 122 will, through the operation of eccentrics 110 in yoke bearing members 124, be reciprocated to cause the teeth 119 and 120 alternately to approach and recede from the sheet of stock carried on the interior of rotating cylinder 63. It is obvious that a greater number of movable members similar to or specifically varied from members 119 and 120 may be caused to operate through properly positioned openings in the wall of cylinder 56. For the purpose of lubrication of said movable members and the operating eccentrics the cylinder 56 may be partially filled with oil, as indicated in Fig. 12.

The means for forwarding the stock longitudinally along cylinder 56 may comprise the wing members 73 positioned either as indicated in Fig. 12 or in Fig. 13. Where, as in the form shown in Fig. 12, but one set of movable engaging members is used, under some conditions it is desirable to provide a baffle plate which will be held under spring pressure in contact with the compacted sheet of material. An excellent device for this purpose comprises a bar 129 secured by means of flexible members 130 to cylinder 56 and being forced outwardly by a series of compression members 131, which, as shown, may be powerful spiral springs, or might be pads of india rubber or oppositely positioned leaf springs, the function of the device being to yieldingly force the member 129 into engagement with the rapidly moving sheet of compacted material.

The operation of the device of my invention in its various forms and aspects has been fully given in connection with the detailed description thereof.

The fundamental principle underlying the invention in all of its aspects consists in the provision of a member which may be rotated at very high speed and into one end of which the cotton seed or other stock to be treated may be fed, being, by means of the centrifugal force generated by such rapid rotation, compacted into a very dense and highly compressed sheet, and thereafter acting upon such sheet while in such condition so as to cause the individual cotton seeds or other individual units comprising the sheet to be moved relatively, so that said individual members will be rubbed or ground against one another with great force thereby cleaning the hulls of lint or other extraneous material. During all of this action the sheet of material is subjected to currents of air at very high velocity, which instantly remove the lint and lighter particles of dust but which, owing to the centrifugal force which throws the heavier particles closely into contact with the walls of the rotated cylinder, will have no effect upon the seed or grain. In machines of well known construction it would be impossible to utilize currents of air of such strength for the reason that the stock itself would be withdrawn from the machine and passed through the fan.

It is to be noted here that the speed of rotation of the container is a variable feature of my invention, according to the size or diameter thereof and the quality and condition of cotton seed or other material treated therein. Of course, the peripheral speed of the container must always be sufficient to generate enough centrifugal force to hold the material in rotating engagement with the wall of the container in opposition to the force of gravity, and with most forms of cotton seed such speed will need to be relatively high, so that the sheet of cotton seed will be densely compacted and the movement of the individual seed in contact with one another will be under great pressure. The actual rate of rotation of the container, however, will vary in accordance with the diameter thereof, the peripheral speed for any given rate of rotation increasing, of course, in proportion to the increase of the diameter. I do not wish to be limited to any particular speed or rate of rotation for my container, but desire to claim as my invention a container rotated at any speed sufficient to compact the cotton seed or other material by means of centrifugal force enough so that the rubbing of said seed when subject to that force will effect the end sought.

I claim:

1. A machine for delinting cotton seed comprising a container, means for continuously introducing cotton seed within the container, means for rotating the container at high speed whereby centrifugal force will compact said seed against the interior wall of the container into a dense sheet, and a fixed member extending into the path of the moving sheet for causing relative contacting movement of the individual seeds composing the sheet.

2. A machine for delinting cotton seed comprising a container, means for introducing cotton seed within the container, means for rotating the container at high speed whereby centrifugal force will compact said seed against the interior wall of the container into a dense sheet, and a plurality of pins or arms extending in fixed relation radially into the path of said sheet.

3. A machine for delinting cotton seed comprising a container, means for introducing cotton seed within the container, means for rotating the container at high speed whereby centrifugal force will compact said seed against the interior wall of the container into a dense sheet, a plurality of pins or arms extending radially into the path of said sheet, and means periodically to withdraw said pins from and return them to position to contact with said sheet.

4. A machine for delinting cotton seed comprising a container, means for introducing cotton seed within the container, means for rotating the container at high speed whereby centrifugal force will compact said seed against the interior wall of the container into a dense sheet, means engageable with said sheet in a relatively fixed position for causing relative contacting movement of the individual seeds, and means periodically to withdraw said means from and return the same to engaging position.

5. A machine for delinting cotton seed comprising a container, means for introducing cotton seed within the container, means for rotating the container at high speed whereby centrifugal force will compact said seed against the interior wall of the container into a dense sheet, and a baffle plate arranged in the path of said sheet so as to divide the same and cause relative contacting movement of the individual seeds.

6. A machine for delinting cotton seed comprising a container, means for introducing cotton seed within the container, means for rotating the container at high speed whereby centrifugal force will compact said seed against the interior wall of the container into a dense sheet, a plurality of pins or arms extending radially into the path of said sheet, and a baffle plate arranged in advance of said pins to divide the sheet and cause relative contacting movement of the individual seeds subsequent to the action of the pins.

7. A machine for delinting cotton seed comprising a container, means for introducing cotton seed within the container, means for rotating the container at high speed whereby centrifugal force will compact said seed against the interior wall of the container into a dense sheet, a baffle plate arranged in the path of said sheet so as to divide the same and cause relative contacting movement of the individual seeds, and means for progressively forwarding the sheet of stock along the container.

8. A machine for delinting cotton seed comprising a container, means for introducing cotton seed within the container, means for rotating the container at high speed whereby centrifugal force will compact said seed against the interior wall of the container into a dense sheet, a plurality of pins or arms extending radially into the path of said sheet, a baffle plate arranged in advance of said pins to divide the sheet and cause relative contacting movement of the individual seeds subsequent to the action of the pins, and means for progressively forwarding the sheet of stock along the container.

9. A machine for delinting cotton seed comprising a cylindrical container, means for introducing cotton seed within said cylinder, means for rotating the cylinder at high speed, and means held within the cylinder fixed with relation to the rotary movement thereof for engaging the cotton seed carried around on the interior of said cylinder.

10. A machine for delinting cotton seed comprising a cylindrical container, means for introducing cotton seed within said cylinder, means for rotating the cylinder at high speed, means held within the cylinder fixed with relation to the rotary movement thereof for engaging the cotton seed carried around on the interior of said cylinder, including means for forwarding cotton seed longitudinally of said cylinder to the discharge end thereof.

11. A machine for delinting cotton seed comprising a cylindrical container, means for introducing cotton seed within said cylinder, means for rotating the cylinder at high speed, means held within the cylinder fixed with relation to the rotary movement thereof for engaging the cotton seed carried around on the interior of said cylinder, including means for forwarding cotton seed longitudinally of said cylinder to the discharge end thereof, and means to adjust said forwarding means to cause the same to forward said seed faster or slower as desired.

12. A machine for delinting cotton seed comprising a container, means for introducing cotton seed within the container, means for rotating the container at high speed whereby centrifugal force will compact said seed against the interior wall of the container into a dense sheet, means for causing relative contacting movement of the individual seeds composing the sheet, means for progressively forwarding the sheet along the container, and means to adjust said forwarding means to cause the same to forward said seed faster or slower as desired.

13. A machine for delinting cotton seed comprising a cylindrical container, means for introducing cotton seed within said cylinder, means for rotating the cylinder at high speed whereby centrifugal force will compact said seed against the interior wall of the cylinder into a dense sheet, and an obliquely arranged baffle plate held in relatively fixed position with the cylinder for causing relative contacting movement of the individual seeds and movement of the sheet longitudinally of the cylinder.

14. A machine for delinting cotton seed comprising a frame, inner and outer cylinders rigidly secured on said frame, a rotatable cylinder positioned so as to surround said inner cylinder and be within the outer cylinder, means provided in the inner cylinder for introducing cotton seed to the interior of the rotatable cylinder, means to rotate said last named cylinder at high speed whereby centrifugal force will compact said seed against the interior wall of the cylinder into a dense sheet, and members carried by the inner cylinder so as to project within the path of said sheet.

15. A machine for delinting cotton seed comprising a frame, an inner cylinder rigidly secured on said frame, a rotatable cylinder positioned so as to surround said inner cylinder, means provided in the inner cylinder for introducing cotton seed to the interior of the rotatable cylinder, means to rotate said last named cylinder at high speed whereby centrifugal force will compact said seed against the interior wall of the cylinder into a dense sheet, members carried by the inner cylinder so as to project within the path of said sheet, and means for projecting said members radially from the inner cylinder to cause the operative parts thereof to recede from and approach the path of said sheet.

16. A machine for delinting cotton seed comprising a rotatable cylinder, means for introducing cotton seed within the cylinder near one end thereof while the cylinder is in motion, a series of obliquely disposed plates for engaging the cotton seed and forwarding the same within the cylinder longitudinally thereof, and means for moving said plates to vary the obliquity thereof and correspondingly vary the rate of forwarding action.

17. A machine for delinting cotton seed comprising a rotatable cylinder, a fixed cylinder within said rotatable cylinder and extending outside of the same, said fixed cylinder being provided with openings through which the cotton seed may be fed to the interior of the rotatable cylinder while the same is in motion.

18. A machine for delinting cotton seed comprising a rotatable cylinder, a fixed cylinder within said rotatable cylinder and extending outside of the same, said fixed cylinder being provided with an opening in the portion outside and another opening in the portion inside of the rotatable cylinder through which the cotton seed may be fed to the interior of the rotatable cylinder while the same is in motion.

19. A machine for delinting cotton seed comprising a rotatable cylinder, a fixed cylinder within said rotatable cylinder and extending outside of the same, an air inlet space being provided between the end of said rotatable cylinder and the fixed cylinder, said fixed cylinder being provided with openings through which the cotton seed may be fed to the interior of the rotatable cylinder while the same is in motion, and means on the fixed cylinder within the rotatable cylinder for engaging the cotton seed as it is moved thereby to prevent the same from passing out through said air inlet opening.

20. A machine for delinting cotton seed comprising a rotatable cylinder, a fixed cylinder within said rotatable cylinder and extending outside of the same, an air inlet space being provided between the end of said rotatable cylinder and the fixed cylinder, said fixed cylinder being provided with openings through which the cotton seed may be fed to the interior of the rotatable cylinder while the same is in motion, and an obliquely disposed plate on the fixed cylinder and extending into proximity with the interior wall of the rotatable cylinder for moving cotton seed therein away from said air inlet opening.

21. A machine for delinting cotton seed comprising a frame, a fixed cylinder carried by said frame, a shaft journaled in said frame and extending centrally through said cylinder, a rotatable cylinder carried by said shaft and surrounding the fixed cylinder, means for introducing cotton seed within the rotatable cylinder, members extending through the fixed cylinder for engaging the cotton seed as it is moved by the rotatable cylinder, and connections to said shaft for periodically retracting and projecting said members.

22. A machine for delinting cotton seed comprising a frame, a fixed cylinder carried by said frame, a shaft journaled in said frame and extending centrally through said cylinder, a rotatable cylinder carried by said shaft and surrounding the fixed cylinder, means for introducing cotton seed within the rotatable cylinder, bars mounted for reciprocating radial movements within the fixed cylinder, members on said bars adapted to be projected thereby into position for engaging the cotton seed as it is moved by the rotatable cylinder, and means on said shaft coöperating with said bars for reciprocating the same.

23. A machine for delinting cotton seed comprising a rotatable container, means for introducing cotton seed within the container while the same is in motion, a transverse bar non-rotatably mounted in proximity to the interior wall of said container, and means for resiliently forcing said bar into engagement with the sheet of cotton seed carried around by the container.

In testimony whereof I affix my signature in presence of two witnesses.

KENNEDY DOUGAN.

Witnesses:
F. A. WHITELEY,
H. A. BOWMAN.

Copies of this patent may be obtained for five cents each, by addressing the "Commissioner of Patents, Washington, D. C."